(12) United States Patent
Tohler et al.

(10) Patent No.: US 7,349,788 B2
(45) Date of Patent: Mar. 25, 2008

(54) SYSTEM FOR REDUCING POWERTRAIN REACTION TORQUE

(75) Inventors: Bill Tohler, Willis, MI (US); Michael Tiller, Canton, MI (US); Paul Bowles, Grosse Ile, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 11/604,163

(22) Filed: Nov. 25, 2006

(65) Prior Publication Data

US 2007/0142993 A1  Jun. 21, 2007

Related U.S. Application Data

(62) Division of application No. 10/780,353, filed on Feb. 17, 2004, now Pat. No. 7,151,987.

(51) Int. Cl.
*G06G 7/76* (2006.01)

(52) U.S. Cl. .......................... 701/70; 180/197; 477/166

(58) Field of Classification Search .................. 701/51, 701/67–70; 180/197, 233, 244–248; 477/166, 477/170, 179
See application file for complete search history.

(56) References Cited

U.S. PATENT DOCUMENTS 5,251,719 A * 10/1993 Eto et al. ..................... 180/197
5,448,478 A * 9/1995 Eto ............................... 701/69

* cited by examiner

*Primary Examiner*—Yonel Beaulieu
(74) *Attorney, Agent, or Firm*—David Kelley, Esq.; Tung & Associates

(57) ABSTRACT

A system is provided for controlling the inertia of a vehicle's powertrain during sudden braking events. Torque generated by rapid deceleration of the vehicle's drive wheels during braking is prevented from being transmitted through the vehicle's driveline by a clutch which disengages the drive wheels from high effective inertia components in the driveline. The clutch is actuated by a signal produced by any of several sensors on the vehicle which sense a sudden braking event. Driveline speed is adjusted to match drive wheel speed before the clutch is deactivated to reengage driveline with the drive wheels.

34 Claims, 4 Drawing Sheets

SYSTEM FOR REDUCING POWERTRAIN REACTION TORQUE

FIELD OF THE INVENTION

This is a divisional of application(s) Ser. No. 10/780,353 filed on Feb. 17, 2004 now U.S. Pat. No. 7,151,987

This invention generally relates to vehicle powertrains, and deals more particularly with a system for controlling powertrains having high inertias and reaction torques.

BACKGROUND OF THE INVENTION

Environmental concerns and the need for fuel conservation has spurred the development of new hybrid propulsion systems for vehicles. Hybrid electric vehicle (HEV) powertrains for example, typically include electric traction motors, high voltage electric energy storage systems, and modified transmissions. Electric energy storage systems include batteries and ultra capacitors. Primary power units for these systems may include spark ignition engines, compression ignition direct injection (e.g., diesel) engines, gas turbines and fuel cells.

HEV powertrains are typically arranged in series, parallel or parallel-series configurations. With parallel-series arrangements, multiple motors operating in multiple operating modes sometimes require the use of several gear sets to effectively transmit power to the traction wheels. As a result, HEV powertrains often possess considerable effective inertia at the wheels compared to conventional ICE powertrains. This is due in part to the potentially large inertia of the hybrid motor devices, as well as the significant gearing from motor to wheels that is often employed.

Powertrains possessing relatively high effective inertias such as those of HEVs, result in certain problems that require solutions. For example, the application of braking force to the vehicle's traction wheels during a sudden braking event, may result in a very rapid angular momentum change in the powertrain. Specifically, a rapid deceleration of the traction wheels during braking results in a counter-torque being transmitted from the traction wheels back through the driveline. Because many of the components connected in the driveline have relatively large effective inertias at the wheels, the counter-torque produced by the braking event can produce relatively high reactive torque levels in the powertrain. This reaction torque is transmitted through the gearing mechanisms to the transmission housing, and can have deleterious effects on powertrain and driveline components, particularly under sudden conditions, such as when the vehicle's ABS system is activated.

Accordingly, a need exists in the art for a system of reducing or controlling powertrain inertia during operating conditions that impose high inertial forces on drive train components. The present invention is intended to satisfy this need.

SUMMARY OF THE INVENTION

A system is provided for controlling inertial forces within a vehicle powertrain during certain operating conditions, such as sudden braking events. The control system reduces these inertial forces through the use of relatively simple powertrain components such as clutches and existing vehicle sensors. A further advantage of the present system resides in its compatibility with a wide range of HEV configurations and powertrain geometries.

In accordance with a first, non-limiting embodiment of the invention, a method is provided for controlling a vehicle powertrain during a braking event, which includes at least partially disengaging the powertrain from a set of traction wheels when the onset of the braking event is sensed. The braking event is sensed using a variety of methods, including monitoring the vehicle's existing ABS (Antilock Braking System), or measuring the rotational speed of the traction wheels. In one embodiment, a planetary gear in the transmission is controlled in a manner to disconnect the driveline from the traction wheels. In another embodiment, an automatically actuated clutch is used to disconnect the powertrain from the wheels. In still another embodiment, a slip clutch is used to partially disconnect the powertrain from the traction wheels, thereby reducing the counter-torque applied to the driveline by the traction wheels.

According to another non-limiting aspect of the invention, a hybrid vehicle drive system is provided that includes an internal combustion engine, an electric motor, a pair of vehicle traction wheels and a driveline connecting the traction wheels with the combination of the internal combustion engine and the electric drive motor. The system also includes a vehicle braking system for applying brake force to the traction wheels during a braking event, and an inertial control system for controlling the effective powertrain inertia at the wheels during a vehicle braking event. The inertial control system is automatically activated by control signals produced during a braking event. The system includes one or more devices which partially or fully disengage the driveline from the wheels vehicle before undesirable counter-torque produced by the rapidly decelerating wheels is transferred back through the driveline.

These and other features and advantages of the present invention may be better understood by considering the following details of a description of a preferred embodiment of the invention, which should be considered as illustrative and non-limiting. In the course of this description, reference will frequently be made to the attached drawings.

DETAILED DESCRIPTION OF THE PREFERRED EMBODIMENT

Figure 4:
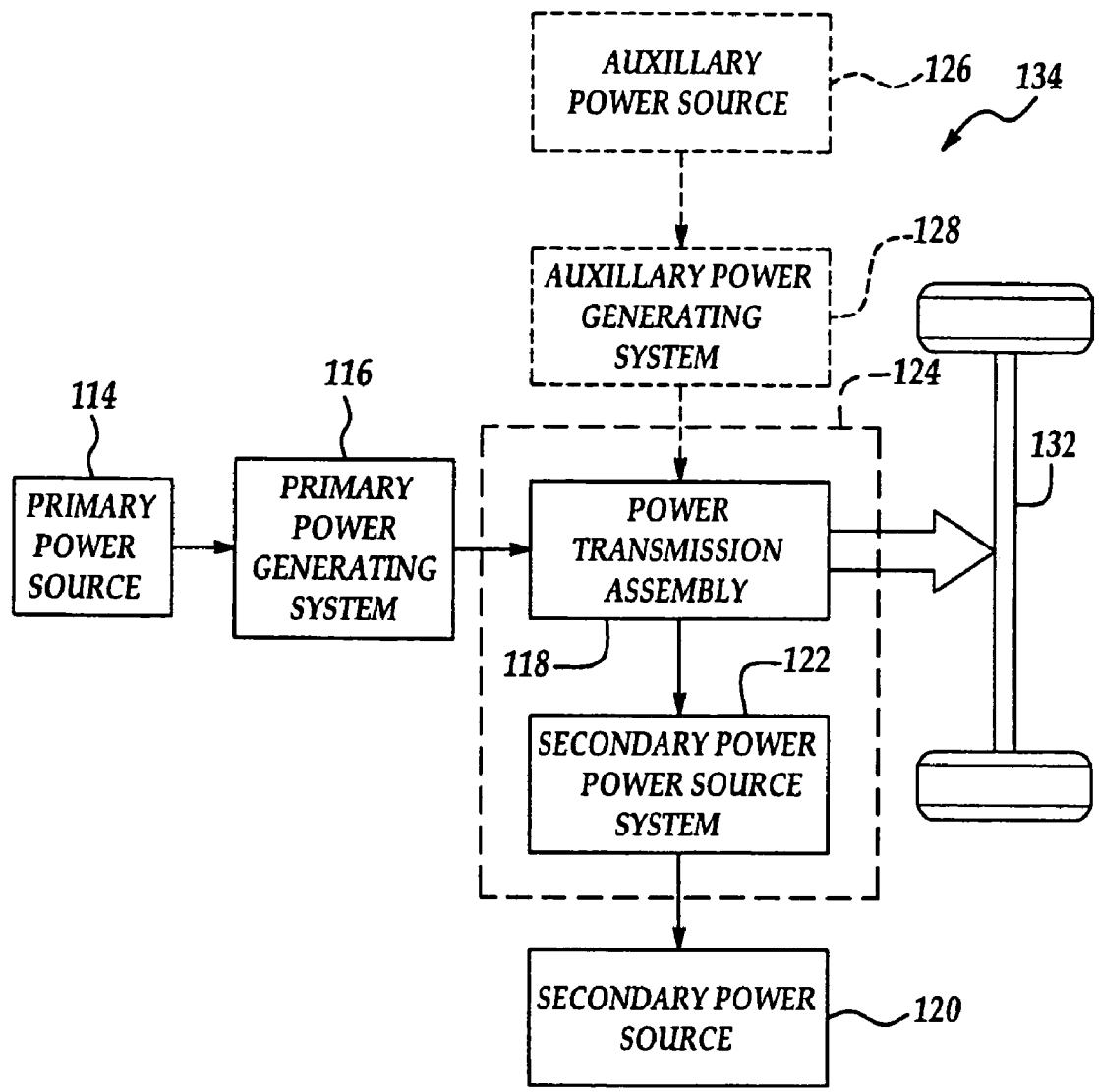
FIG. 4 is a block diagram of a generic architecture for a hybrid vehicle system; and, FIGS. 5A-5C are block diagrams showing exemplary hybrid powertrain system configurations.

FIG. 4 shows a generic architecture for a hybrid vehicle system 134, to which the present invention may be applied. The system 134 includes a primary power source 114, such as a gasoline, diesel or other gas fuel supply, coupled to a primary power generating system 116, such as an internal combustion engine. The primary power generating system 116 generates a primary drive torque that is transmitted to the vehicle's driveline 132 via power transmission assembly 118. The power transmission assembly 118 can be a conventional manual, automatic or continuously variable automotive transmission, or other equivalent gearing mechanism for transmitting mechanical power produced by the primary power generating system 116. The system 134 further includes a secondary power source 120, such as a battery, ultracapacitor, hydraulic accumulator or other energy storage device, and secondary power generating system 122, such as one or more electric machines or other torque generating devices, for supplementing the drive torque delivered by the primary power generating system 116. The system may further include an auxiliary power source 126 coupled to an auxiliary power generating system 128, such as a fuel cell system or Auxiliary Power Unit (APU) for providing additional drive torque.

The primary power generating system 116 may, for example, be a gasoline, natural gas, hydrogen or other gaseous, fuel-burning internal combustion engine. Power transmission assembly 118 transmits the output of both the internal combustion engine 116 and the secondary power generating system 122 to the vehicle driveline 132. The power transmission assembly 118 may be a converter-less automatic transmission constructed and arranged with the secondary power generating system 122, such as an integrated high voltage electric motor/generator. The power transmission assembly 118 and secondary generating system 120 can be packaged into a single modular hybrid transmission unit 124

Figure 5A:
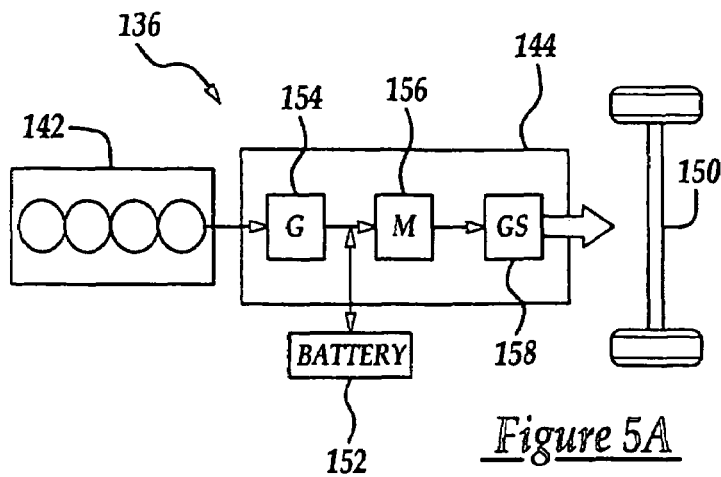
Figure 5B:
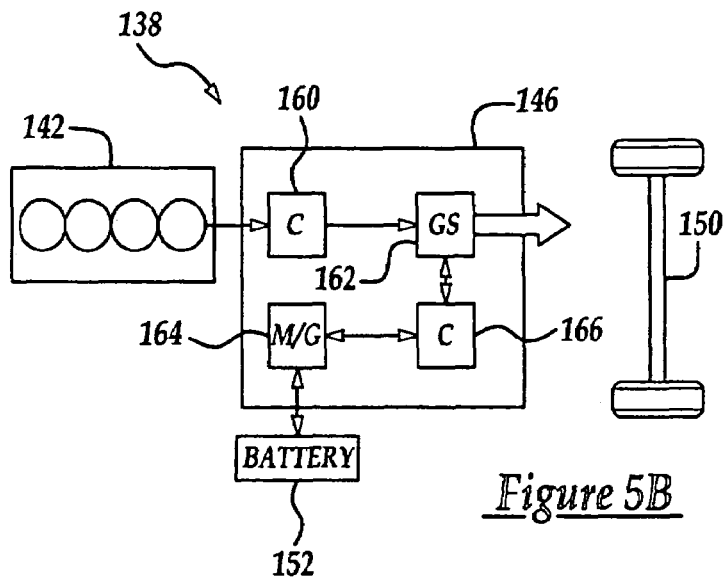
Figure 5C:
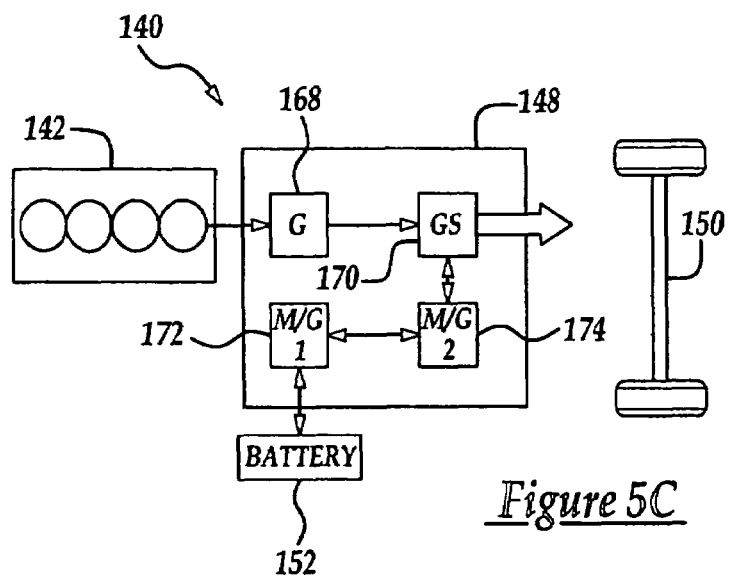

FIGS. 5A through 5C show exemplary hybrid powertrain system configurations that may be used to implement the present invention. The systems shown in FIGS. 5A-5C are shown by way of example and not limitation.

FIG. 5A depicts a so-called "series" hybrid configuration 136 having an internal combustion engine 142 coupled to a modular hybrid transmission unit 144. Modular hybrid transmission unit 144 includes an electric generator 154 that produces electrical energy for powering the vehicle drive wheels 150 via an electric motor 156 and gear set 158. Electrical storage device 152 stores electrical energy via the generator 154 when the internal combustion engine produces more power than required, and supplements engine power via the electric motor when power demand exceeds the engine power output. FIG. 5B show a so-called "parallel" hybrid configuration 138 wherein modular hybrid transmission unit 46 delivers driveline torque via a first power path having the internal combustion engine 142, a coupling device 160 and a gear set 162. The coupling devices 160, can be any suitable devices, for example a gear set or clutch, for transmitting mechanical energy to the vehicle driveline 160. The coupling devices 160, 166 can be the same device. FIG. 5C shows a so-called "parallel-series" configuration 140 wherein a modular hybrid transmission unit 148 includes motor/generators 172, 174 electrically and/or mechanically coupled, for example via planetary gearset, to deliver power to a gearset 170 and driveline 150.

Figure 1:
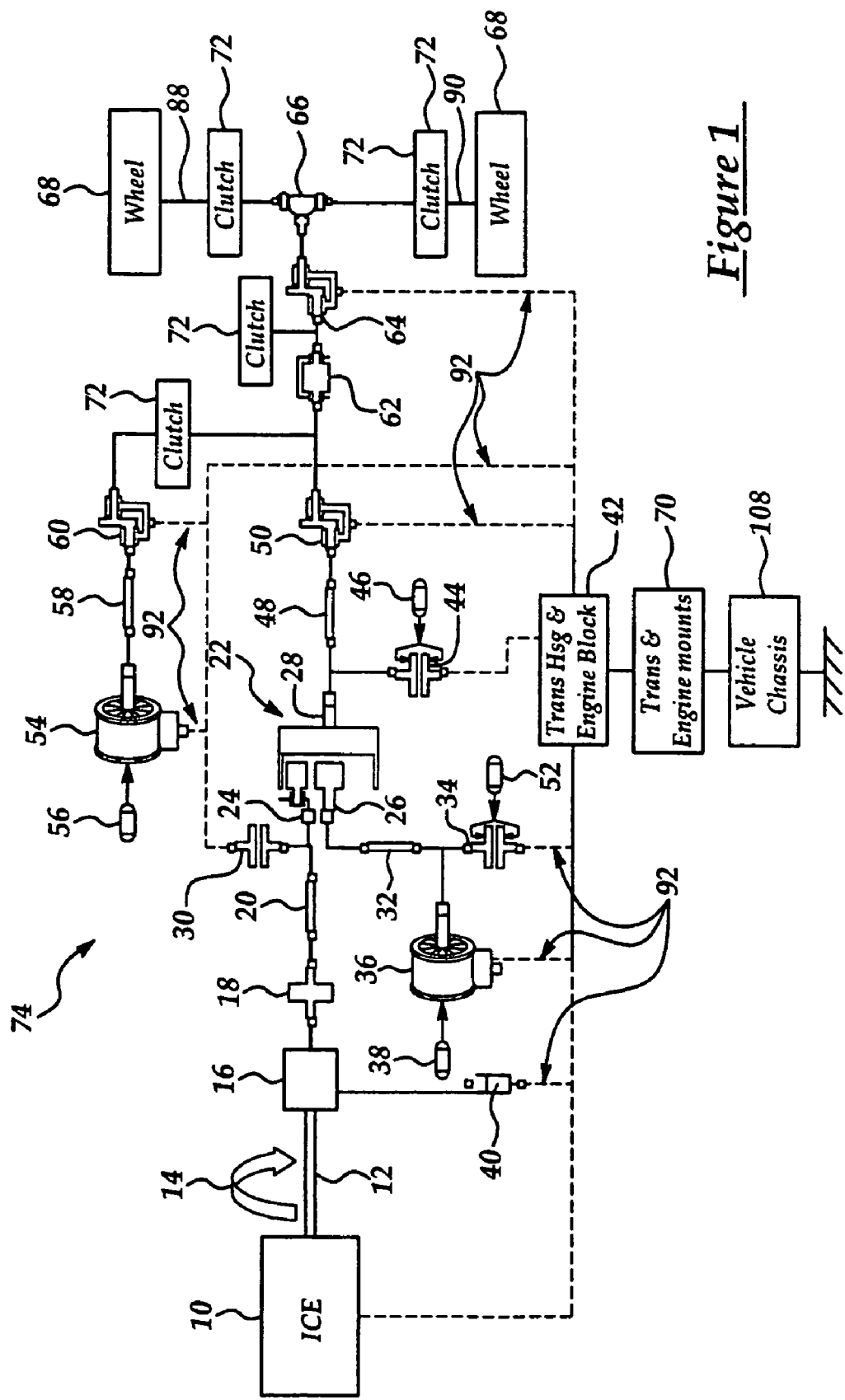
FIG. 1 is a combined block and diagrammatic view of a powertrain for a hybrid electric vehicle, employing an inertial control system in accordance with one embodiment of the present invention.

Referring now to FIG. 1, a high effective inertia powertrain 74 for driving a vehicle is depicted. In the illustrated embodiment, the powertrain 74 is suitable for use in an HEV utilizing one or more fuel and/or motor drives. As shown, the powertrain 74 includes an internal combustion engine (ICE) 10 and a DC electric motor 54, each connected through a later-described driveline to drive a pair of traction wheels 68, sometimes also referred to as drive wheels. The engine 10 has a crankshaft 12 rotating in the direction of arrow 14, which is connected to the driveline by a damper coupling 16. The rotating friction of the engine 10 is schematically indicated by the damper 40. Torque is transmitted by the damper coupling 16 through a rigid or compliant shaft 20 to a planetary gear set 22. A damper 18 between the damper coupling 16 and the shaft 20 functions to isolate torsional fluctuations transmitted from the engine 10 to the transmission line. The planetary gear set 22 includes a carrier gear 24 and sun gear 26 driving a ring gear 28. A one-way clutch 30 connected between the carrier gear 24 and a transaxle housing 42 functions to prevent the engine 10 from rotating in a reverse direction. The transaxle housing 42 encases transmission and differential components. The mechanical mounting or connection of these various components is schematically represented by the various broken lines 92 connecting these components to transaxle housing and engine block 42. The sun gear 26 is connected through an output shaft 32 of an electric motor generator 36 whose speed is controlled by a torque control signal delivered to its control input 38.

Although not specifically shown, it should be noted that the motor 54 and generator 36 are connected with one or more suitable energy storage systems. The speed of the carrier gear 24 and the engine 10 is a function of the speeds of the ring gear 28 and the sun gear 26. Thus, generator 36 is used to control the speed of the engine 10 by changing the speed of the sun gear 26. The use of the generator 36 to control the speed of the engine 10 may be used in an intelligent control system to control engine speed independent of driveline speed. A clutch 34 operated by a control signal at its input 52 functions to selectively lock the generator 36 against rotation. Locking the generator 36 prevents the sun gear 26 from rotating, the result of which is the planetary gear 22 directly connects the engine 10 to the traction wheels 68.

Ring gear 28 is connected through counter shaft 48 and gear assemblies 50, 64 to a torque splitting device in the form of a differential 66. A parking brake 44 actuated by control signal at its input 46 is connected to and selectively locks the countershaft 48 against rotation. Gear assemblies 50, 64 possess inertia represented by the numeral 62. The differential 66 splits the driveline torque and delivers it through a pair of half shafts 88, 90 respectively to the traction wheels 68.

A second power source for driving traction wheels 68 is provided by the DC electric motor 54 whose speed is determined by a torque control signal received at its input 56. Motor 54 provides the dual function of driving the traction wheels 68 and acting as a regenerative braking generator. During vehicle braking, the motor 54 functions as an electrical generator using kinetic energy of the vehicle to generate electricity that is stored in a battery (not shown) for later use. The motor 54 delivers torque at its output shaft 58 through a gear set 60 to the differential 66, which in turn transmits the torque to the traction wheels 68. The motor 54 possesses a relatively high effective inertia at the wheels, compared to an conventional ICE powered vehicle, due in part to its own inertia as well as that of the gear assemblies 60 and 64.

The powertrain 74 described above possesses a relatively high amount of effective rotating inertia at the wheels, compared to the powertrain of a conventional ICE powered vehicle. This relatively high amount of effective rotating inertia is partially due to the use of multiple drive motors, motor controls and gear sets that are necessary to manage the delivery of power to the traction wheels 68. A major portion of this inertia is attributable to the electric motor 54 and the gear sets 60 and 64 that mechanically connect it to the traction wheels 68. The gear sets 22 and 50 also materially contribute to the effective powertrain inertia, as does the ICE 10 and the generator 36. The various component parts of the powertrain 74 are mechanically connected either directly or indirectly to a transaxle housing and ICE engine block 42. The transaxle housing and engine block 42 are in turn carried on corresponding transaxle and engine block mounts 70 that are secured to the vehicle's chassis 108. Thus, numerous components, including gear assemblies transmit torque to mountings on the transaxle housing and engine block 42, which in turn transfer this torque to the mounts 70.

In the event of a sudden braking event, as occurs during a sudden where the vehicle's ABS system is actuated, the braking force applied to the traction wheels 68 causes rapid deceleration of these wheels, in turn resulting in a rapid deceleration of the powertrain that is mechanically connected to the wheels 68. This rapid deceleration of the powertrain, which has a large effective inertia, produces a commensurately large counter-torque which is transferred back through the driveline and powertrain 74. This counter-torque is transmitted to each of the powertrain components where it is applied to the transaxle housing and engine block 42, and their mounts 70. The reactive forces on the transaxle housing and engine block 42, as well as their chassis mounts 70 are particularly high because of the large effective rotating inertia of the powertrain 74. As a result, the reactive forces applied to the transaxle housing and block 42, and the mounts 70 may be sufficient to damage these components under certain sudden braking conditions. Even under normal braking conditions the relatively high powertrain inertia and torque levels can produce undesirable noise, vibration and harshness (NVH). Furthermore, large fluctuating torques in the powertrain can affect the performance of the ABS system.

In accordance with the present invention rapid changes in powertrain angular momentum stemming from sudden braking is controlled by limiting or substantially eliminating the amount of reactive torque transmitted between the traction wheels 68 and the powertrain components upstream from the wheels, particularly those contributing higher effective rotational inertias. As will be described below, this inertial control can be carried out by either completely disconnecting high inertia powertrain components from the wheels 68, in response to a braking event, or by reducing the amount of reactive torque transmitted through the driveline during a braking. The inertial control of the present invention may be implemented using one or more clutches 72 for selectively disengaging high inertial components of the powertrain 74. For example, a clutch 72 may be interposed between gear sets 60 and 64 to disengage the electric motor 54 from the differential 66. Alternatively, a clutch 72 may be interposed between gear sets 50 and 64 to disengage both the electric motor 54 and engine 10. In order to effect even greater control over powertrain inertia, one or two clutches 72 may be installed between the differential 66 and the traction wheels 68, thereby allowing disengagement of the entire powertrain 74 from the traction wheels 68.

Figure 2:
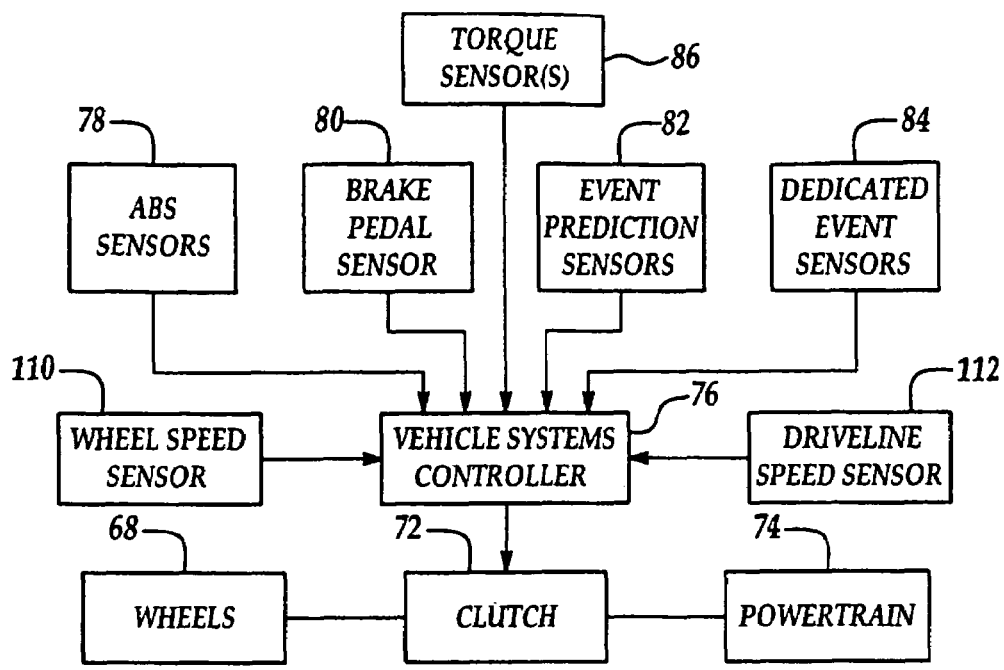
FIG. 2 is a block diagram showing additional details of the present invention.

Referring now also to FIG. 2, the construction of the clutch 72 will depend on the particular application and available packaging geometries, however a number of conventional mechanisms can be employed to provide the clutch function. For example, a conventional clutch disc assembly may be employed in which a number of friction disc plates are brought into engagement with each other to connect an input shaft with an output shaft. In one approach, the clutch discs are normally biased into engagement with each other to connect the input shaft with the output shaft, and a control signal is used to actuate a hydraulic or electrical actuator which forces the discs apart in the event of a braking event. Alternatively, hydraulic pressure may be employed to normally force the clutch plates together which are spring biased to separate when hydraulic pressure is removed in response to a braking signal.

A number of other clutch and similar technologies may be employed such as an integrated wheel end, a magnetorheological or electroheological device. In any event, the clutch 72 is automatically actuated by a signal generated by a controller 76 which may be a dedicated, programmed device, or an existing controller on the vehicle which is used to manage the inertial control system as an auxiliary function. Essentially, the control signal received by the clutch 72 is indicative of an braking event in which the level of brake force applied to the traction wheels 68 is sufficient to create undesired levels of counter-torque in the powertrain 74. The controller 76 actuates the clutch 72 in response to any of a variety of signals or vehicle conditions that indicate an aggressive or sudden braking event. Examples of such signals are those produced by the vehicle's existing ABS sensors 78, brake pedal brake travel sensors 80 or various event prediction sensors 82 used to predict events or conditions suggesting that sudden braking may be required or imminent. In addition, the inertial control system may rely on its own dedicated event sensors 84 which might comprise by way of example, inertial sensors or body deflection sensors which senses events suggesting that sudden braking is eminent or has commenced. Similarly, torque sensors 86 mounted on the transaxle housing or engine block 42, or their mounts 70 could be used to sense when an unusually high reactive torque is present in the powertrain 74 which requires activation of a clutch 72 to disengage the powertrain 74 from the wheels 68. In any event, it is important that the various sensors or other signal generators used to activate the clutch 72 have a particularly rapid response time so that the powertrain is disengaged before significant reactive torque can be transmitted.

Although a clutch 72 has been described and illustrated as a suitable means of disengaging the power train, other equivalent devices are suitable for effecting powertrain disengagement and reactive torque control. For example, a device can be provided for locking the ring gear 28 against rotation in response to a braking event. Such a device would, in effect, function very similar to the parking brake 34, preventing the reactive torque in the powertrain 74 from reaching the engine 10. Alternatively, any one of the gear sets 50, 60, 64 could be replaced by a planetary gear assembly that would nominally have one port (ring, sun or carrier) locked against the transmission housing. When the powertrain is to be disconnected, the locked port would be released and allowed to spin freely, thereby disconnecting the powertrain from the wheels.

In many cases, it may be desirable to reconnect the driveline and powertrain 74 with the wheels immediately following a braking/powertrain disconnect sequence. For example, when a vehicle passes over a series of ice patches, the vehicle's ABS system may be successively activated for brief periods, resulting, each time in the powertrain being disconnected from the wheels. If however, during the period of disconnection, the driveline speed falls substantially below that of the wheels, the reconnection process may produce substantial NVH, and in some cases, possibly damage the driveline components. Therefore, in accordance with the present invention, the driveline speed is synchronized with chat of the wheels before they are reconnected. This is achieved by sensing both the driveline and wheel speeds using corresponding sensors 110, 112, and determining the speed difference using the controller 76. Based on the determined speed difference, the controller transmits a control signal to any of the motor 54, generator 36 or the engine 10 to increase driveline speed until it is within a preselected range of the wheel speed, at which time the controller 76 deactuates the clutch 72 thereby effecting re-engagement.

Figure 3:
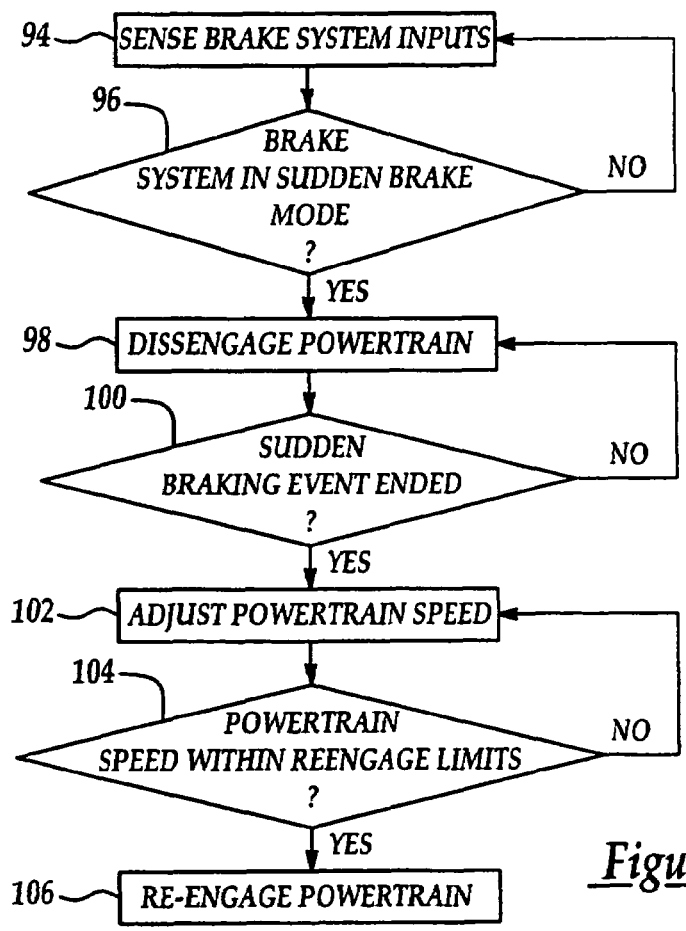
FIG. 3 is flowchart showing the steps employed in carrying out an exemplary control method of the present invention.

Attention is now also directed to FIG. 3 which shows the basic steps employed in carrying out the control method of the invention. Brake and other systems on the vehicle are monitored at step 94 to determine whether an aggressive or sudden braking event has occurred, is about to commence, or could potentially occur in the immediate future. As previously discussed, this monitoring function can be performed by any a variety of sensors on the vehicle which feed information to a controller 76. At step 96, the controller 76 determines whether an aggressive or sudden braking event has occurred, based on the information developed by the event sensors. If it is determined that a sudden braking event is occurring, the controller 76 actuates the clutch 72 to disengage the powertrain 74, as indicated at step 98. In order to assure smooth reengagement of the powertrain 74 with the wheels 68 at the end of the braking event, the controller continues to monitor the information provided by the event sensors to determine when the sudden braking event has ended, as shown at step 100. When it is determined that the braking event has ended, the powertrain speed is adjusted at step 102, so that the powertrain speed is close to the speed of the wheels 68. Next, at step 104, a determination is made of whether the powertrain speed is within certain limits that assure smooth re-engagement. If the powertrain speed is within these limits, then at step 106, the clutch is actuated to re-engage the powertrain 74 with the wheels 68

It is to be understood that the specific methods and techniques which have been described are merely illustrative of one application of the principle of the invention. Numerous modifications may be made to the method as described without departing from the true spirit and scope of the invention.

What is claimed:

1. A drive system for a vehicle, comprising:
   a powertrain having at least one electric drive motor, a driveline, and a geared transmission connecting the drive motor with the driveline;
   a torque splitting device connected with the driveline;
   a pair of drive shafts connected with and receiving torque from the torque splitting device;
   a pair of wheels respectively connected with and driven by the drive shafts; and,
   a device automatically actuated by a vehicle braking event for limiting the torque applied to the powertrain as a result of braking torque applied to the wheels, said device adapted to at least partially disengage high inertial components from the powertrain during the braking event.

2. The drive system of claim 1, wherein the torque limiting device comprises a clutch.

3. The drive system of claim 2, wherein the clutch is operative to disconnect the wheels from the powertrain during the braking event.

4. The drive system of claim 2, wherein the clutch comprises a slip clutch operative to allow only a portion of the torque produced by the wheels to be transmitted to the powertrain.

5. The drive system of claim 2, wherein the clutch is connected between the torque splitting device and the driveline.

6. The drive system of claim 2, wherein the clutch is connected between the torque splitting device and the wheels.

7. The drive system of claim 2, wherein the clutch is connected between the driveline and the electric drive motor.

8. The drive system of claim 2, further comprising a second electric drive motor, and wherein the torque limiting device includes a clutch coupled between the wheels and the combination of the first and second electric drive motors.

9. The drive system of claim 2, further comprising a second electric drive motor, and wherein the torque limiting device includes a clutch coupled between the second electric drive motor and the torque splitting device.

10. The drive system of claim 2, wherein the clutch comprises engageable friction discs.

11. The drive system of claim 1, wherein the torque limiting device comprises a transmission control device for causing the transmission to disconnect the driveline from the motor.

12. The drive system of claim 11, wherein the transmission control device comprises a brake for locking a gear in the transmission against rotation.

13. The drive system of claim 11, wherein the transmission control device comprises a planetary gear set and a brake or locking one of the gears in the gear set against rotation, thereby disconnecting the driveline from the electric motor.

14. A drive system for a vehicle, comprising:
   a powertrain having at least one electric drive motor, a driveline, and a geared transmission connecting the drive motor with the driveline;
   a torque splitting device connected with the driveline; a pair of drive shafts connected with and receiving torque from the torque splitting device;
   a pair of wheels respectively connected with and driven by the drive shafts; and,
   a device automatically actuated by a vehicle braking event for limiting the torque applied to the powertrain as a result of braking torque applied to the wheels;
   wherein the torque limiting device comprises a clutch, said clutch operative to at least partially disengage the wheels from the powertrain during the braking event.

15. The drive system of claim 14, wherein the torque limiting device comprises a slip clutch, said clutch operative to allow only a portion of the torque produced by the wheels to be transmitted to the powertrain during the braking event.

16. The drive system of claim 14, wherein the clutch is operative to disconnect the wheels from the powertrain during the braking event.

17. The drive system of claim 14, wherein the clutch is connected between the torque splitting device and the driveline.

18. The drive system of claim 14, wherein the clutch is connected between the torque splitting device and the wheels.

19. The drive system of claim 14, wherein the clutch is connected between the driveline and the electric drive motor.

20. The drive system of claim 14, further comprising a second electric drive motor, and wherein the clutch is coupled between the wheels and the combination of the first and second electric drive motors.

21. The drive system of claim 14, further comprising a second electric drive motor, wherein the clutch is coupled between the second electric drive motor and the torque splitting device.

22. The drive system of claim 14, wherein the clutch comprises engageable friction discs.

23. A drive system for a vehicle, comprising:
a powertrain having at least one electric drive motor, a driveline, and a geared transmission connecting the drive motor with the driveline;
a torque splitting device connected with the driveline;
a pair of drive shafts connected with and receiving torque from the torque splitting device;
a pair of wheels respectively connected with and driven by the drive shafts; and,
a device automatically actuated by a vehicle braking event for limiting the torque applied to the powertrain as a result of braking torque applied to the wheels;
wherein the torque limiting device comprises a transmission control device for causing the transmission to disconnect the driveline from the motor.

24. The drive system of claim 23, wherein the transmission control device comprises a brake for locking a gear in the transmission against rotation.

25. The drive system of claim 23, wherein the transmission control device comprises a planetary gear set and a brake or locking one of the gears in the gear set against rotation, thereby disconnecting the driveline from the electric motor.

26. A drive system for a vehicle, comprising:
a powertrain having at least one electric drive motor, a driveline, and a geared transmission connecting the drive motor with the driveline;
a torque splitting device connected with the driveline;
a pair of drive shafts connected with and receiving torque from the torque splitting device;
a pair of wheels respectively connected with and driven by the drive shafts; and,
a clutch automatically actuated by a vehicle braking event for limiting the torque applied to the powertrain as a result of braking torque applied to the wheels, said clutch adapted to at least partially disengage high inertial components from the powertrain during a braking event, said high inertial components comprising said electric drive motor and said wheels.

27. The drive system of claim 26, wherein the clutch is operative to disconnect the wheels from the powertrain during the braking event.

28. The drive system of claim 26, wherein the clutch comprises a slip clutch operative to allow only a portion of the torque produced by the wheels to be transmitted to the powertrain.

29. The drive system of claim 26, wherein the clutch is connected between the torque splitting device and the driveline.

30. The drive system of claim 26, wherein the clutch is connected between the torque splitting device and the wheels.

31. The drive system of claim 26, wherein the clutch is connected between the driveline and the electric drive motor.

32. The drive system of claim 26, further comprising a second electric drive motor, and wherein the clutch is coupled between the wheels and the combination of the first and second electric drive motors.

33. The drive system of claim 26, further comprising a second electric drive motor, and wherein the clutch is coupled between the second electric drive motor and the torque splitting device.

34. The drive system of claim 26, wherein the clutch comprises engageable friction discs.

* * * * *